(12) United States Patent
Black et al.

(10) Patent No.: US 8,909,864 B2
(45) Date of Patent: Dec. 9, 2014

(54) MULTICAST WRITE COMMANDS

(75) Inventors: Joseph David Black, Houston, TX (US);
Michael G Myrah, Cypress, TX (US);
Balaji Natrajan, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 380 days.

(21) Appl. No.: 13/250,630

(22) Filed: Sep. 30, 2011

(65) Prior Publication Data

US 2013/0086320 A1    Apr. 4, 2013

(51) Int. Cl.
*G06F 12/08*    (2006.01)
*H04L 29/08*    (2006.01)
*G06F 3/06*    (2006.01)

(52) U.S. Cl.
CPC .............. *H04L 67/14* (2013.01); *G06F 3/0611* (2013.01); *G06F 3/0659* (2013.01); *G06F 3/0683* (2013.01)
USPC .... 711/118; 711/154; 711/162; 711/E12.001; 711/E12.017

(58) Field of Classification Search
USPC ........... 711/162, 118, 154, E12.001, E12.017
See application file for complete search history.

(56) References Cited

U.S. PATENT DOCUMENTS

| | | | |
|---|---|---|---|
| 6,356,944 B1 | 3/2002 | McCarty | |
| 7,434,014 B2 | 10/2008 | Ali et al. | |
| 7,574,542 B2 | 8/2009 | Burroughs et al. | |
| 2005/0262309 A1* | 11/2005 | Frey et al. | 711/141 |
| 2006/0036648 A1* | 2/2006 | Frey et al. | 707/200 |
| 2009/0228651 A1 | 9/2009 | Sharma et al. | |

FOREIGN PATENT DOCUMENTS

JP    2001005617    1/2001

* cited by examiner

*Primary Examiner* — Yong Choe
(74) *Attorney, Agent, or Firm* — Preetam Pagar

(57) ABSTRACT

Techniques for implementing a multicast write command are described. A data block may be destined for multiple targets. The targets may be included in a list. A multicast write command may include the list. Write commands may be sent to each target in the list.

20 Claims, 5 Drawing Sheets

MULTICAST WRITE COMMANDS

BACKGROUND

There are many different protocols available to enable communications between computing devices and storage devices. One such protocol is the serial attached small computer systems interface (SAS) protocol. Computing devices, such as server computers, that need to read or write data to storage devices may be referred to as initiators. The storage devices may be referred to as targets. Some types of targets include hard disk drives, solid state drives, tape drives, and optical drives. Expander devices may be used to form a fabric between multiple initiators and targets. Thus, communication between an initiator and a target may pass through the fabric which enables the communication between the devices.

DETAILED DESCRIPTION

Figure 1:
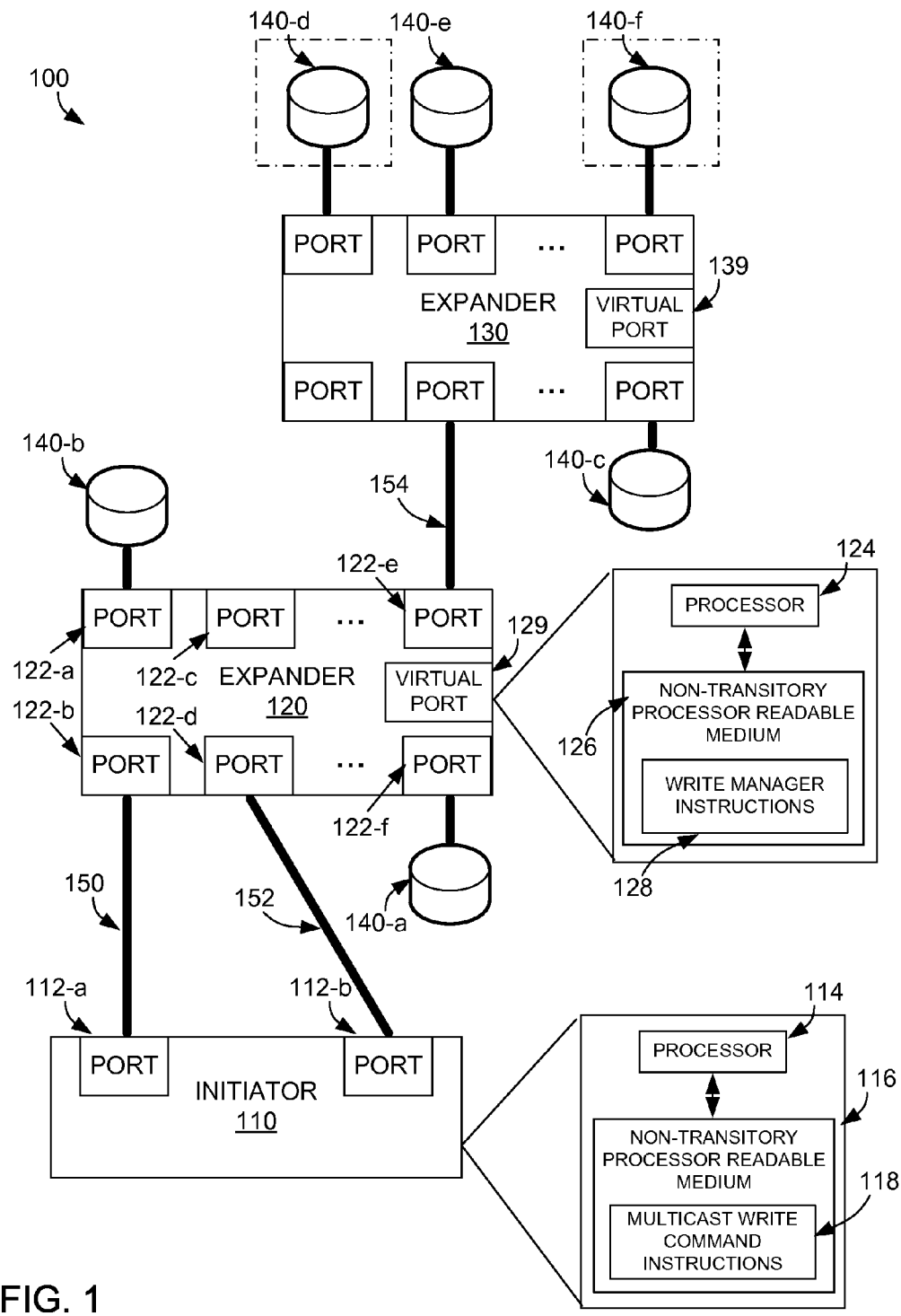
FIG. 1 is an example of a high level system diagram.

An initiator device may be connected to the fabric through one or more communications channels. For example, in the SAS protocol, a communications channel may be referred to as an SAS lane. An initiator device may send commands to access storage devices to the fabric through the use of the communications channels. Likewise, the target devices may also connect to the fabric through a communications channel. Each target may be identified through an identifier, which may be referred to as a target address. Commands sent by an initiator may include the target address. The fabric may contain one or more expander devices. The expander devices may connect to both initiators and targets to form the fabric. An expander may receive a command from an initiator containing the address of a target. The command may then be routed through the fabric to the intended destination based on the target address.

For example, in an SAS architecture, there may be multiple initiators, multiple interconnected expanders, and multiple targets. An initiator that wishes to write data to a target may initiate a write command which identifies the target. The initiator may send this command over a communications channel, also referred to as an SAS lane, to an expander. The expander may then determine, based on the target identifier, if the target is attached to the expander. If not, the expander may forward the command to another expander that may be connected to the target. The initiator and the target may then exchange data to be written through the fabric formed by the expanders.

In some cases, the same data may be written to multiple target devices. For example, in redundant array of independent disk one (RAID-1) configurations, the same data is mirrored between two or more storage devices, such as two or more hard disks. As another example, in some storage device erase procedures, a defined set of data may be written to the storage device in order to erase the device. If multiple storage devices are being erased at the same time, the same set of data will be sent to each storage device.

A problem with efficiency may arise when the same data is being written to multiple targets. For example, in the case of an SAS fabric, an initiator may be connected to the fabric through two SAS lanes. If the same data is written to two targets, a separate write command may be sent to each target. Thus, both SAS lanes may be occupied while the data transfer is in progress, despite the fact that the same data is being written, albeit to two different targets. During the period of time that both SAS lanes are in use, any additional read or write commands to other targets may need to wait for one of the SAS lanes to become available. The problem may be further exacerbated if there is only a single lane between the initiator and the fabric. In such a case, additional read or write commands may need to wait for both of the duplicate write commands to complete prior to the SAS lane becoming available.

Techniques described herein overcome the problem of duplicate transmission of data through the use of a multicast write command and a write manager. An initiator may be aware that the same data is to be written to more than one target device. Rather than generate multiple write commands, the initiator may generate a single multicast write command. Included in the multicast write command may be a list of targets to which the data should be written. The multicast write command may be sent to a single target, which may be referred to as a write manager. The write manager, in an example implementation, may be a virtual target that resides on a virtual port, also referred to as a virtual PHY, of an expander device. The write manager may receive the multicast write command and send individual write commands to each target included in the list of targets in the multicast write command.

The write manager may then send a write command to each target included in the list of targets in the multicast write command. The write manager may receive the data to be written a single time from the initiator and then send that data to each target. Once the targets have successfully written the data, the write manager may respond to the initiator indicating that the multicast write command completed successfully. Thus, because duplicate data is not sent from the initiator to each target, the bandwidth of the available communications channels may be used more efficiently.

Furthermore, a fabric may include multiple expanders, each of which may implement a write manager. By selecting a write manager closest in fabric topology to the intended targets, the bandwidth of the overall fabric may be more efficiently utilized. The techniques described above are explained in further detail below with respect to the figures which describe an example implementation of a multicast write command and write managers.

FIG. 1 is an example of a high level system diagram. The system 100 may be an example of a system that implements the techniques described herein. The system may include an initiator 110, expanders 120, 130, and targets 140($a$-$f$). Although only a limited number of initiators, expanders, and targets are shown in FIG. 1, this is for purposes of simplicity of description. System 100 may include any number of initiators, expanders, and targets.

Initiator 110 may be any type of computing device that may utilize storage devices that are located on the fabric. For example, one type of initiator may be a server computer. The initiator may include ports 112-$a$,$b$ to communicate with the fabric. In some implementations of initiators, the ports may be included on a controller card. For example, in the case of disk storage devices, the initiator may be a disk array controller that is included in a server computer. The disk array controller may be a RAID controller. In some implementations, the controller may be integrated within a server computer. Although ports 112-a,b are shown as separate physical ports, in some example implementations there may be only a single physical connection to the fabric, with one or more logical communications channels designated within the physical communications channel. Regardless of specific implementation, an initiator may have one or more ports for communications with the fabric.

The initiator may include a processor 114. Coupled to the processor may be a non-transitory processor readable medium 116. The non-transitory processor readable medium may contain thereon a set of instructions, which if executed by the processor causes the initiator to implement the functionality described herein. For example, the non-transitory medium may include a set of multicast write command instructions 118. These instructions may cause the initiator to generate a multicast write command if it is determined that the same data is to be written to more than one target device.

The ports of an initiator may be connected to a fabric which is comprised of expander devices. Expander 120 may be an example of one such device. Expander 120 may contain a number of ports 122-(a-f). Although only six ports are shown, this is for purposes of simplicity of explanation. An expander device may have any number of ports. The ports on expander 120 may be connected to a number of different devices. As already explained, one such device is an initiator, such as initiator 110. The ports on an expander may also be connected to storage devices, which are referred to as targets 140, which will be described in further detail below. The ports on an expander may also be connected to ports on other expanders in order to form a fabric.

An expander may receive a command from an initiator that is directed to a target. The expander may determine if the target is directly connected to a port of the expander, and if so send the command to that port. If the target is not directly connected, the expander may forward the command to an expander on another port that may be connected to the target. As such, the expanders form a fabric, wherein communications to/from an initiator may be transmitted to/from a target regardless of if the target is directly connected to a specific expander.

The expander 120 may also include a processor 124. Coupled to the processor may be a non-transitory processor readable medium 126 which contains thereon a set of instructions, which if executed by the processor cause the expander to implement the functionality described herein. For example, the non-transitory medium may contain thereon a set of write manager instructions 128 which cause the expander to implement a write manager. In an example implementation, a write manager may be a virtual device which presents itself as a target on a virtual port 129, which can also be referred to as a target on a virtual PHY. To an initiator, a write manager may appear the same as any other target. An initiator may thus direct commands to a write manager in the same way as commands to any other target. The functionality of a write manager will be described in further detail below. System 100 may include any number of additional expanders. As shown, the system includes a second expander 130 which has a generally identical structure to expander 120.

System 100 may also include any number of targets 140. Although only targets 140(a-f) are shown, it should be understood that this is for simplicity of explanation. Any number of targets are possible within system 100. A target 140 may be any type of storage device. Some examples of storage devices can include hard disk drives, solid state disk drives, tape drives, and optical drives. The targets may be configured in any number of different ways. For example, targets may be configured to be individual storage volumes. Targets may also be aggregated to appear as a single volume. Targets may also be redundantly configured, such as in a RAID array. The techniques described herein are applicable whenever the same data is to be written to multiple targets, regardless of the particular configuration of the targets.

As an example of system 100 in operation, an initiator 110 may determine that a piece of data should be written to two targets, such as targets 140-d,f. In some cases, although identical data is to be written, the data may need to be written at different offsets in the target devices. The techniques described herein may accommodate such situations, as will be described below. Absent the techniques disclosed herein, the initiator may send separate write commands to each target device over communications channels 150, 152. However, as explained above, using separate communications channels to send the same data is inefficient, as while the channels are in use sending duplicative information, additional read or write requests cannot be sent because all communications channels are in use.

Utilizing the techniques described herein, the initiator may generate a single multicast write command. Included in the multicast write command may be a list of targets that are the intended recipients of the data. Furthermore, if the data is intended for different offsets within each target, the multicast write command may include the offset for each target within the multicast write command. The initiator may then select a write manager implemented as a virtual device on a virtual PHY as the target of the multicast write command. The initiator may then send the multicast write command to the write manager a single time.

The write manager may receive the multicast write command and then send individual write commands to each target in the list of targets included in the multicast write command, including an offset if needed. The write manager may then relay the data between the initiator and the multiple targets, as will be described in further detail with respect to FIG. 2. However, what should be noted is that the initiator only sends a single command that is directed to the virtual port of the write manager. As such, efficiency of the communications channels from the initiator to expander 120 is improved, because duplicate data is not sent by the initiator to each individual target.

As shown, FIG. 1 includes multiple expanders 120,130 which have each implemented write managers as targets. Proper selection of a target write manager for the multicast write command may further increase the efficiency of the fabric. For example, if the write manager 129 associated with expander 120 is selected, the write manager on expander 120 may send separate commands to each of targets 140-d,f. As such, duplicate communications may be required over link 154, which connects expander 120 with expander 130, which is ultimately connected to the targets. However, if the write manager 139 associated with expander 130 is selected, a single multicast write command may be sent from the initiator, through expander 120, to the write manager on expander 130. Thus, by selecting a write manager that is closest in network topology to the intended targets, the amount of fabric bandwidth that is used for duplicate data transmission may be decreased, thus increasing the efficiency of the fabric.

Figure 2:
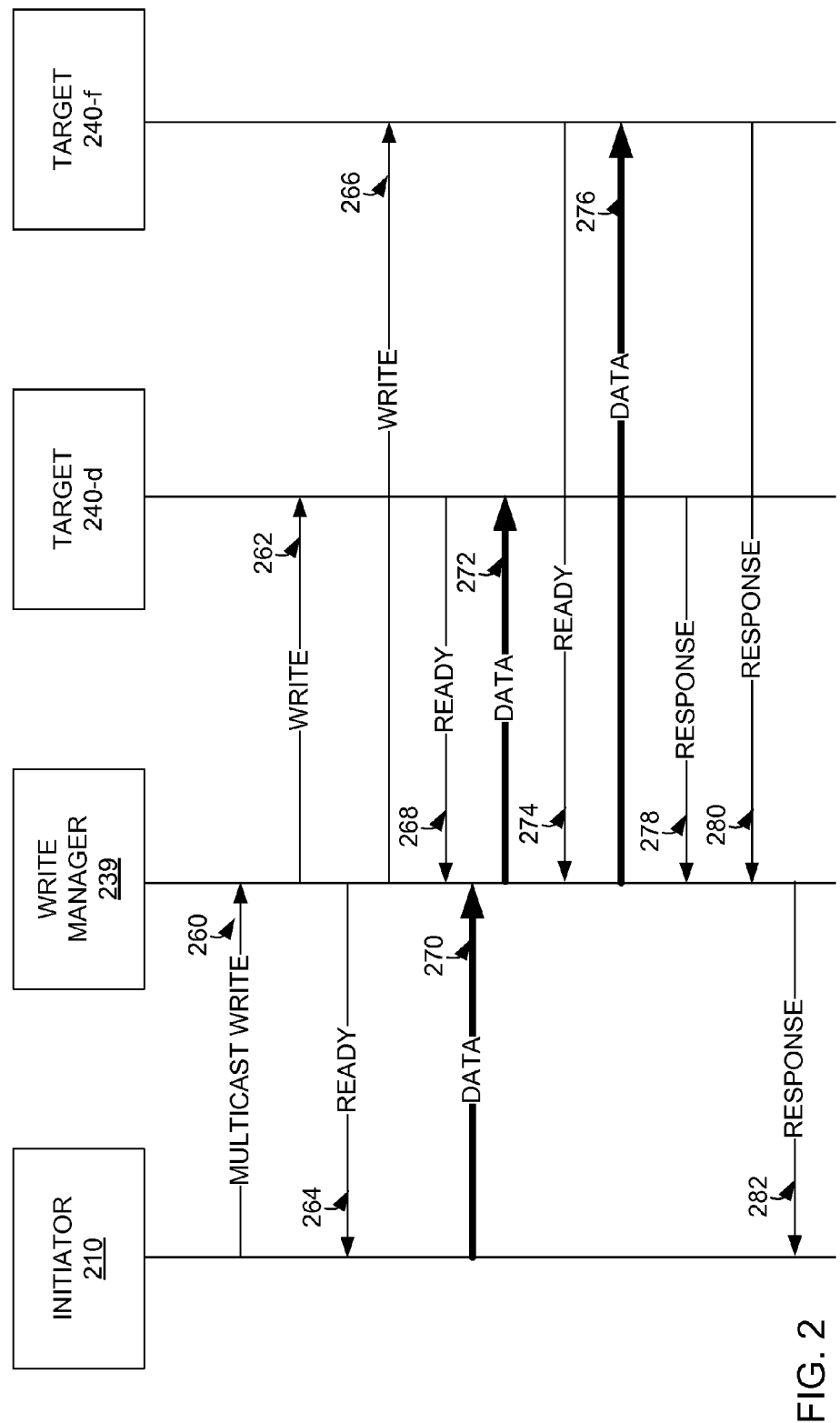
FIG. 2 is an example of a multicast write message sequence.

FIG. 2 is an example of a multicast write message sequence. FIG. 2 depicts the messages that may be exchanged during a multicast write that was described with respect to FIG. 1. For example, initiator 210 may represent the initiator described in FIG. 1. Write manager 239, may be the write manager that is disposed on expander 130 in FIG. 1. Targets 240-d,f may represent targets 140-d,f to which duplicate data may be written. The initiator 210 may determine that a portion of data shall be written to two different targets 240-d,f. Rather than sending individual write commands to each target, the initiator may determine if a write manager exists in the path between the initiator and the targets. If so, the initiator may generate a multicast write command. The multicast write command may include a list of targets to which the data should be written. If the data is to be written to different offsets within each target, the initiator may also include the per target offset in the multicast write command.

The initiator 210 may then send the multicast write command 260 to a write manager 239 that is disposed on an expander in the path between the initiator and the targets. Upon receipt of the multicast write command, the write manager may perform two tasks. The first may be to send a ready response 264 back to the initiator to inform the initiator that the write manager is ready to receive the data to be written to the target. The write manager may also send individual write commands 262,266 to the intended targets to inform the targets that data is to be written to each target. The individual write commands may include the per target offset from the multicast write command, if needed. As shown, these two tasks may occur independently. In other words, the ready response may be sent to the initiator before, during, or after sending the write commands to the individual targets. As such, the initiator does not need to wait for individual responses from each target. From the perspective of the initiator, the data is being written to the write manager, not the individual targets.

Upon receipt of the ready response 264, the initiator may begin to send data 270 to the write manager. Although depicted as a single message, this is simply for ease of description. In some example implementations, the data transfers may actually be broken up into multiple data transfer messages. However, what should be understood is that the data is sent to the write manager, as opposed to the individual targets. Meanwhile, the write manager may receive a ready response 268 from target 240-d, indicating that the target is ready to receive the data. The write manager may then send the data 272 to the target 240-d.

It should be noted that target 240-f may not yet have responded to the write command 266. As such, the data sent in message 270 may be temporarily cached within the write manager until such time as the target 240-f is ready to receive the data. Caching the data within the write manager allows the initiator to send the data to the write manager without concern for if the data can be written to the target at that time. At some point, the ready response 274 may be received from target 240-f. At this point, the write manager may send the data 270 that had been cached within the write manager to target 240-f in a data message 276.

Once the data has been successfully written to the targets, each target 240-d,f may respond with a response message 278, 280, which may indicate a successful completion of the write command by each target. The write manager may aggregate these response messages. Once a response message is received from all targets included in the list of targets in the multicast write command, the write manager may send a response 282, indicating a successful completion of the multicast write command.

Although the description of FIG. 2 is generally in terms of a write sequence performed with SAS devices, it should be understood that FIG. 2 is an example of an implementation. What should be understood is that commands to write the same data to multiple destinations are aggregated into a single multicast write command. This multicast write command may then be sent to a virtual device, such as a write manager, which appears to an initiator as a single target. A single response to the multicast write command may then be received by the initiator. In addition, although only two targets were described with reference to FIG. 2, it should be understood that there may be any number of targets. The techniques described above are applicable whenever the same data is written to multiple targets, regardless of how many targets are presented.

Figure 3:
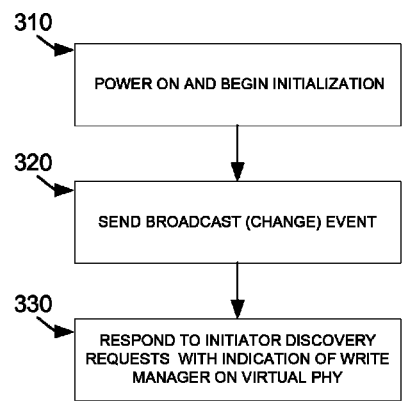
FIG. 3 is an example of a high level flow diagram of an initialization sequence.

FIG. 3 is an example of a high level flow diagram of an initialization sequence. The initialization sequence shown in FIG. 3 may be an example of an initialization sequence performed by an expander that implements the techniques described herein. In block 310, the expander may power on and begin initialization. The initialization process may also be started upon a reboot of the expander. Initialization tasks such as reading instructions from a non-transitory processor readable medium to provide the expander with the desired write manager functionality may be performed. The expander may also perform any other initialization tasks needed for base expander functionality.

In block 320, the expander may send a broadcast (change) event out on the fabric. The use of such an event in an SAS fabric notifies all initiators on the fabric that a new device has been added. Each initiator may then perform a discovery process to determine the topology of the fabric, including all targets that are now reachable through the newly initialized expander.

In block 330, the expander may respond to initiator discovery requests with an indication of a write manager on a virtual PHY. The expander may also respond with other information, such as targets that are directly attached to the expander and other expanders that are attached to this expander. Through the discovery responses, each initiator may be able to build a map of the topology of the fabric formed by the expanders and the location of the targets within that fabric. The indication that an expander has implemented a write manager on a virtual PHY may allow the initiator to select the write manager as a target of a multicast write command when needed.

Figure 4:
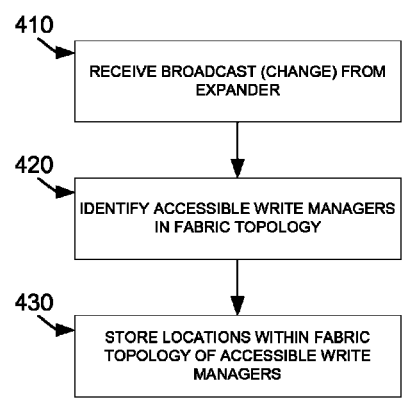
FIG. 4 is an example of a high level flow diagram of fabric topology discovery.

FIG. 4 is an example of a high level flow diagram of fabric topology discovery. The fabric discovery flow shown in FIG. 4 may be an example of discovery performed by an initiator that implements techniques described herein upon receipt of a change event from the fabric. In block 410, an initiator may receive a broadcast (change) event from an expander on the fabric. For example, in an SAS fabric, a change event may be used to notify initiators that there has been a change to the topology of the SAS fabric.

In block 420, the initiator may identify accessible write managers within the fabric topology. As explained above, an initiator may send discovery requests into the fabric to discover the topology of the fabric. Expanders within the fabric may respond to these discovery requests with topology related information. One example of such topology related information may be if the expander has implemented the write manager functionality. If so, the write manager may be presented as a virtual target disposed on a virtual PHY. From the perspective of an initiator, a virtual target appears within the fabric topology in the same manner as an actual physical target, such as a disk drive.

In block 430, the initiator may store locations within the fabric topology of accessible write managers. As explained above, efficiency may be increased by directing multicast write commands to write managers that are located closest to the actual targets within the fabric. By storing the locations of the write manager within the fabric topology, the initiator may be able to determine to which write manager a multicast write command should be sent to achieve an improvement in fabric bandwidth utilization.

Figure 5:
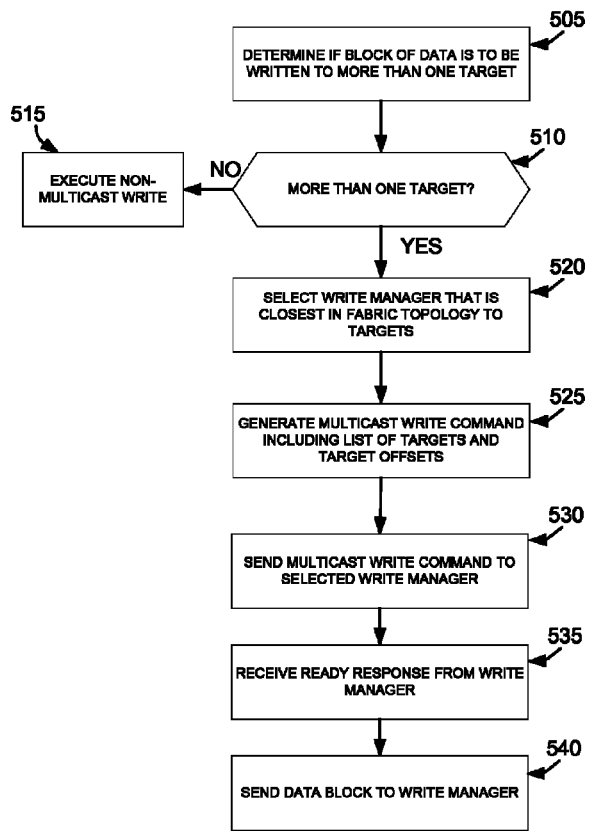
FIG. 5 is an example of a high level flow diagram of sending a multicast write command.

FIG. 5 is an example of a high level flow diagram of sending a multicast write command. In block 505 it may be determined if a block of data is to be written to more than one target. For example, the targets may form a mirrored RAID array, and as such, the same data may be written to each target. In block 510, the result of the determination is evaluated. If the same data is not being written to more than one target, the process moves to block 515, wherein a normal, non-multicast write sequence may be executed. If it is determined that the same data is being written to more than one target, the process moves to block 520.

In block 520 the write manager that is closest in fabric topology to the targets may be selected. As described above, the location of write managers within the fabric topology may be determined during a topology discovery process. Furthermore, selection of a write manager that is closest in topology to the targets may allow for more efficient use of fabric bandwidth. In block 525 a multicast write command which includes a list of targets may be generated. The list of targets in the multicast write command may be used by a write manager to determine which targets are to receive the block of data. The multicast write command may also include a per target offset. If the data block is to be written to the same offset within each target, the per target offsets may be the same. However, if there is a different offset for each target, the offsets may be different.

In block 530 the multicast write command may be sent to the selected write manager. The selected write manager may then send individual write commands to each target, as will be described below. In block 535, a ready response may be received from the selected write manager. The ready response may indicate that the write manager is ready to receive the block of data. In block 540 the data block may be sent to the write manager. The write manager may then send the data block to the individual targets, as will be described with respect to FIG. 6.

Figure 6:
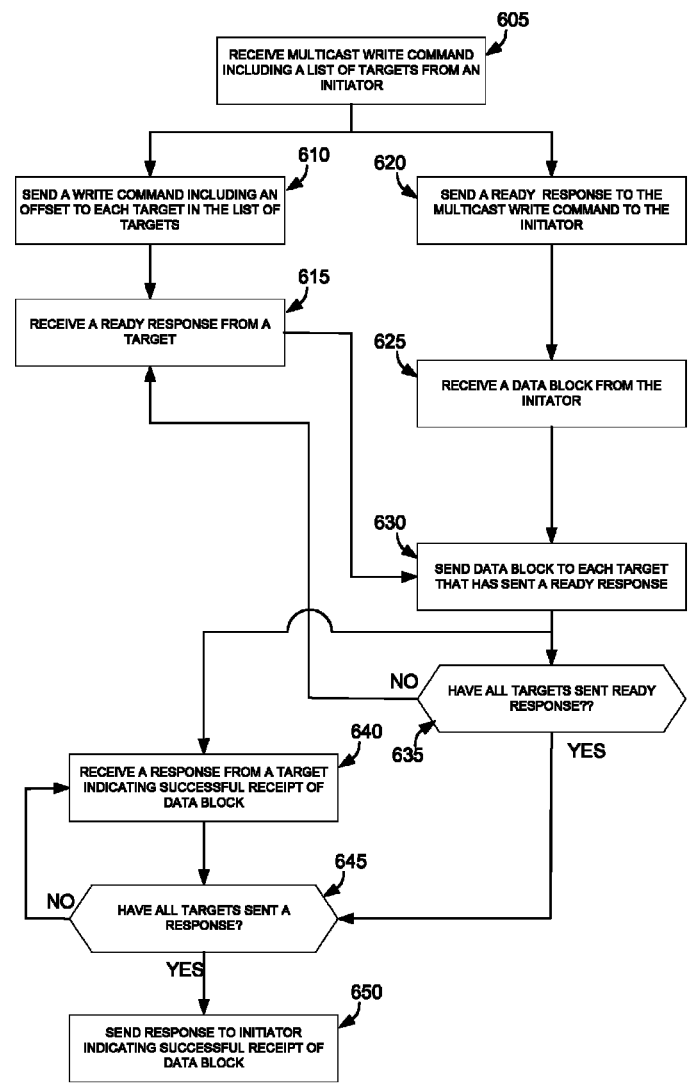
FIG. 6 is an example of a high level flow diagram of receiving a multicast write command.

FIG. 6 is an example of a high level flow diagram of receiving a multicast write command. In block 605 a multicast write command which includes a list of targets may be received from an initiator. At this point, the process may branch into two separate tasks that may be executed in parallel, with some dependencies between the tasks. In block 610, a write command, which may include an offset, may be sent to each target in the list of targets. As described above, in some cases, there may be different offsets per target, while in other cases, the offset may be the same. Regardless of any differences in offset, a write command may be sent to each target. In block 615, a ready response from a target may be received. A ready response form a target may indicate that the target is ready to receive data.

In block 620, a ready response to the multicast write command may be sent to the initiator from the write manager. The ready response may indicate to the initiator that the write manager is ready to receive the data. It should be understood that this does not require that the targets are ready to receive the data, as the write manager may cache the data until the targets are ready to receive it. In block 625, a data block may be received from the initiator. It should be understood that blocks 610,615 and 620,625 may occur substantially in parallel. In other words, block 610,615 are not dependent on the completion of blocks 620,625.

In block 630, the write manager may send the data block to each target that has sent a ready response. For example, the ready response may be the ready response that was received in block 615. The process may then begin two separate loops. One loop may continue until all targets have sent a ready response which results in the data block being sent to the target. The second loop may continue until responses indicating successful receipt of the block are received from all targets. It is not until both loops are complete that the process may end.

In block 635 it may be determined if all targets have sent ready responses. If not, the process returns to block 615 to await additional ready responses from targets. If all targets have sent a ready response, this indicates that the data block has now been sent to all targets. The process may then move to block 645, which will be described below.

The process may also move to block 640, wherein a response from a target indicating successful receipt of a data block is received. A response indicating success may mean that the data block was received by the target and was successful written to the storage device. In block 645, it may be determined if all targets have sent a response indicating successful receipt of the data block. If not, the process returns to block 640 to await additional responses indicating successful receipt of the data block.

If all targets have sent a response indicating successful receipt of the data block, the process moves to block 650. In block 650 a response may be sent to the initiator indicating successful receipt of the data block. Thus the initiator may be made aware that the multicast write command has completed successfully.

We claim:

1. A method comprising:
    determining, at an initiator, if a block of data is to be written to more than one target;
    after receiving a write command intended for multiple intended targets, selecting with the initiator, a write manager closest in a fabric topology to the intended targets;
    generating, with the initiator, a multicast write command specifying plural targets;
    sending the multicast write command from the initiator to the selected write manager; and
    in response to receiving the multicast write command, respectively transmitting, by the write manager, respective individual write commands to the plural targets.

2. The method of claim 1 wherein the multicast write command includes a list of targets to which the block of data will be written.

3. The method of claim 2 wherein the list of targets includes an offset for each target.

4. The method of claim 1 further comprising:
    performing a discovery process upon receipt of a change indication;
    identifying accessible write managers in a fabric topology; and
    storing locations within the fabric topology of the accessible write managers.

5. The method of claim 1 wherein the multicast write command includes an offset for each target in the list of targets when data of the multicast write command is intended for different offsets within each of targets.

6. The method of claim 1 further comprising:
    receiving a data block from the initiator;
    sending the data block to each target in the list of targets;
    receiving responses from each target in the list of targets indicating successful receipt of the data block; and sending a response to the initiator indicating the data block was successfully sent once responses from each target in the list, of targets has been received.

7. The method of claim 1 further comprising caching a data block from the initiator until the data block is sent to each target in the list of targets.

8. The method of claim wherein the multicast write command includes an offset for each target in the list of targets, the offset indicating the location on each target wherein a data block from the initiator is to be written.

9. A non-transitory processor readable medium containing thereon a set of instructions which, if executed by the processor, causes the processor to:
 receive a multicast write command from an initiator, the multicast write command including a list of targets;
 in response to the receiving the multicast write command, selecting with the initiator, a write manager closest in a fabric topology to the intended targets and sending individual write commands respectively to the targets; and
 send a ready response to the multicast write command to the initiator.

10. The non-transitory medium of claim 9 further comprising instructions which cause the processor to:
 receive a data block from the initiator;
 send the data block to each target in the list of targets;
 receive responses from each target in the list of targets indicating successful receipt of the data block; and
 sending a response to the initiator indicating the data block was successfully sent once responses from each target in the list of targets has been received.

11. The non-transitory medium of claim 9 further comprising instructions which cause the processor to:
 respond to a discovery request by presenting the processor as a virtual port on a serial attached SCSI fabric.

12. The non-transitory medium of claim 9 further comprising instructions which cause the processor to:
 cache a data block from the initiator until the data block is sent to each target in the list of targets.

13. The non-transitory medium of claim 9 wherein the multicast write command includes an offset for each target in the list of targets, the offset indicating the location on each target wherein a data block from the initiator is to be written.

14. A device comprising:
 a plurality of physical ports, each port of the plurality of physical ports operatively coupled to a target;
 a virtual port operatively coupled to an initiator; and
 a processor to receive a multicast write command including a list of targets from the initiator over the virtual port, to select a write manager closest in a fabric topology to intended targets, and to send individual write commands to each intended target in the list of targets over the plurality of physical ports.

15. The device of claim 14 wherein the processor is further configured to respond to a discovery process from the initiator with the address of the virtual port.

16. The device of claim 14 wherein the processor is further configured to relay a data block between the virtual port and the targets.

17. The device of claim 14 wherein the device is an expander on a serial attached SCSI fabric.

18. The device of claim 14 wherein the processor is configured to:
 receive a data block from the initiator;
 send the data block to each intended target in the list of targets;
 receive responses from each intended target in the list of targets indicating successful receipt of the data block; and
 send a response to the initiator indicating the data block was successfully sent once responses from each intended target in the list of targets has been received.

19. The device of claim 14 wherein the processor caches a data block from the initiator until the data block is sent to each intended target in the list of targets.

20. The device of claim 14 wherein the multicast write command includes an offset for each intended target in the list of targets, the offset indicating the location on each intended target wherein a data block from the initiator is to be written.

* * * * *

UNITED STATES PATENT AND TRADEMARK OFFICE
CERTIFICATE OF CORRECTION

PATENT NO. : 8,909,864 B2  Page 1 of 1
APPLICATION NO. : 13/250630
DATED : December 9, 2014
INVENTOR(S) : Joseph David Black et al.

It is certified that error appears in the above-identified patent and that said Letters Patent is hereby corrected as shown below:

In the Claims

In column 9, line 3, in Claim 6, delete "list," and insert -- list --, therefor.

In column 9, line 7, in Claim 8, delete "claim" and insert -- claim 1 --, therefor.

Signed and Sealed this
Twelfth Day of May, 2015

Michelle K. Lee
*Director of the United States Patent and Trademark Office*